Oct. 24, 1967  J. R. LARSON ET AL  3,349,138
CYCLOCOOLIGOMERIZATION PROCESS
Filed July 21, 1965
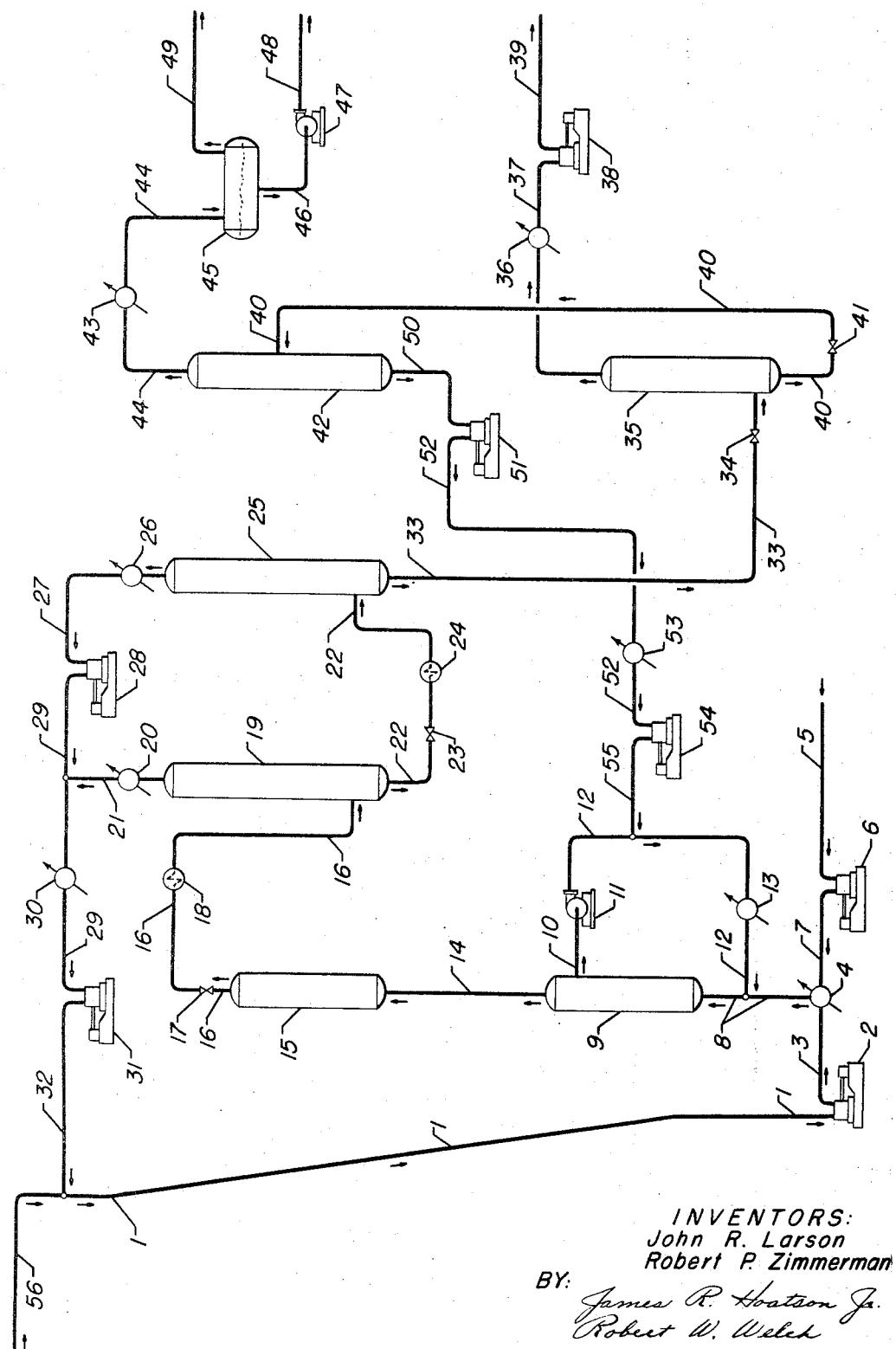
INVENTORS:
John R. Larson
Robert P. Zimmerman
BY:
James R. Hoatson Jr.
Robert W. Welch
ATTORNEYS

United States Patent Office 3,349,138
Patented Oct. 24, 1967

3,349,138
CYCLOCOOLIGOMERIZATION PROCESS
John R. Larson, Palatine, and Robert P. Zimmerman, Downers Grove, Ill., assignors to Universal Oil Products Company, Des Plaines, Ill., a corporation of Delaware
Filed July 21, 1965, Ser. No. 473,599
5 Claims. (Cl. 260—666)

This invention relates to a novel and continuous process for effecting cyclocooligomerization of butadiene and ethylene, i.e., the reaction of two moles of butadiene with one mole of ethylene to form trans,cis-1,5-cyclodecadiene, with trans,trans,trans-1,5,9-cyclododecatriene and 1,4,9-decatriene being formed as by-products of the reaction. The chemistry of the cyclocooligomerization reaction as well as the catalyst relating thereto is known to the art and is described, for example, in Angewandte Chemie International Edition, vol. 2, No. 3, p. 105, dated March 1964, and also vol. 3, No. 10, p. 702, dated October 1964.

It would appear that the cyclocooligomerization process would be particularly useful in the preparation of trans,cis-1,5-cyclodecadiene as a chemical intermediate in the production of sebacic acid. However, despite the utility and demand for sebacic acid, it is not apparent that its production has been achieved on any commercial scale by this method. This can be attributed to the fact that the cyclocooligomerization process has hitherto been considered as not adaptable to a continuous type of operation suitable for large scale production. One contributing factor is the difficulty encountered in the separation and recycle of the relatively expensive homogeneous nickel catalyst over extended periods of operation without undue catalyst loss or deactivation. This has been accomplished by the process of this invention.

In one of its broad aspects, this invention embodies a process which comprises charging ethylene, butadiene and a homogeneous bare nickel catalyst to a reaction zone at cyclocooligomerization reaction conditions and forming a reaction product comprising cyclodecadiene, cyclododecatriene and n-decatriene, withdrawing the resultant reaction mixture and separating butadiene and ethylene therefrom, charging the residual reaction mixture to a separation colume and flashing a portion of the reaction product therefrom at a temperature of from about 100° F. to about 180° F. and at a pressure of from about 0.1 mm. to about 10 mm., recovering the catalyst from said separation column in solution with the residual reaction product and recycling the same to the aforesaid reaction zone.

A more specific embodiment relates to a continuous process for the cyclocooligomerization of ethylene and butadiene, which process comprises charging ethylene, butadiene and a bare nickel catalyst substantially free of aluminum salts to a reaction zone and circulating the reaction mixture therein for a period of from about 0.5 to about 6 hours at cyclocooligomerization reaction conditions and forming a reaction product comprising cyclodecadiene, cyclododecatriene and n-decatriene, withdrawing the resultant reaction mixture and separating ethylene and butadiene therefrom, charging the residual reaction mixture to a separation column, distributing the same therein as a thin surface film and flashing a portion of the reaction product therefrom at a temperature of from about 100° F. to about 180° F. and at a pressure of from about 1 mm. to about 5 mm., recovering the catalyst from said separation column in solution with the residual reaction product and recycling the same to the aforesaid reaction zone.

Other objects and embodiments of this invention will become apparent in the following detailed specification.

The cyclocooligomerization catalyst has been variously referred to in the art as bare nickel, zerovalent nickel, bis-$\pi$-allyl)nickel and the like. In any case, the catalyst results from the reduction of a suitable nickel compound in the presence of electron donors, particularly the $\pi$-electron-containing olefins. Suitable reducing agents include alkyl metal compounds, preferably alkylaluminum derivatives, and also metal hydrides. For example, nickel acetylacetonate is reduced by triethylaluminum in the presence of butadiene. The catalyst is prepared in solution, preferably utilizing one or more products of the process as solvent although aliphatic and aromatic hydrocarbons as well as aliphatic and aromatic ethers have been described as suitable solvents. A description of the catalyst appears in the above cited reference and is referred to hereinafter as a bare nickel catalyst.

In accordance with the process of this invention butadien and ethylene are charged to a reaction zone and reacted therein at cyclocooligomerization reaction conditions in admixture with a homogeneous bare nickel catalyst. Butadiene and ethylene are charged to the reaction zone in at least stoichiometric amounts, i.e., 2 mols of butadiene per mole of ethylene. It is advantageous to charge an excess of ethylene, preferably from about a 1:1 to about a 3:1 mole ratio of ethylene to butadiene, in that said excess is effective in suppressing formation of the cyclododecatriene by-product.

The cyclocooligomerization reaction can be effected at a temperature of from about 32° F. to about 170° F. However, product distribution is adversely affected at temperatures in excess of about 95° F. so that a temperature of from about 32° F. to about 95° F. is preferred. Although butadiene conversion increases with temperature, increasing amounts of the n-decatriene by-product are formed at the expense of the desired cyclodecadiene. Butadiene conversion, particularly to the desired cyclodecadiene, increases with increased residence time in the range of from about 0.5 to about 6 hours. Although a longer ersidence may be employed it does not appear that any particular improvement results therefrom. The cyclocooligomerization reaction is preferably effected in the liquid phase. At the reaction conditions herein disclosed, liquid phase conditions are effected at a pressure of about 300 p.s.i.g. or more, a pressure of from about 500 to about 800 p.s.i.g. being preferred.

The further description of the process of this invention is presented with reference to the attached schematic flow diagram. The schematic flow diagram shows various pumps, compressors, heaters, heat exchangers, control valves, and the like which, although not necessary in the general description of the process of this invention, are included to facilitate the description of a specific embodiment of the invention subsequently presented in greater detail with reference to said drawing. It is understood that other modifications beyond the scope of the schematic flow diagram may be practiced without departing from the generally broad scope of the invention as set out in the appended claims.

In the schematic flow diagram, line 56 is provided whereby ethylene is charged to the process from an external source not shown. The fresh ethylene charge is combined with a recycle stream of ethylene and butadiene from line 32, the last mentioned ethylene and butadiene being recovered for recycle as hereinafter described. The combined streams are passed through a compressor 2 and thereafter to a cooling means 4 by way of line 3 and further combined therein with fresh butadiene from line 7, said butadiene being charged to the process through line 5, and compressor 6. The ethylene-butadiene charge is then continued through line 8 to a first reaction zone 9 together with recycle catalyst from line 12 as will hereinafter appear.

It has been observed that selectivity of the cyclocooligomerization reaction in favor of the desired trans, cis-1,5-cyclodecadiene is considerably improved by treating the reactants and catalyst at conditions to insure a homogeneous reaction mixture and effect isothermal reaction conditions. Although it might be anticipated that such treatment would improve butadiene conversion, its effect on product distribution is surprising.

Accordingly, the schematic flow diagram provides means for continuous circulation of the reaction mixture through the reaction zone 9 to effect a homogeneous reaction mixture and isothermal reaction conditions. The reaction mixture is continuously circulated through said reaction zone, passing upwardly therethrough, exiting by way of line 10 and being returned by means of circulating pump 11, passing through a cooling means 13 and line 12 to re-enter said reaction zone through line 8 in combination with the butadiene-ethylene feed as well as recycle catalyst from line 55 recovered for recycle as hereinafter described.

The cyclocooligomerization reaction is herein depicted as occurring in two reaction zones numbered 9 and 15 respectively. In effect, the cyclocooligomerization reaction is substantially completed in the first reaction zone, the second reaction zone serving as a holding tank at reaction conditions to maximize butadiene conversion.

The reaction mixture is withdrawn from the first reaction zone 9 by way of line 14 at a rate to insure an adequate residence time therein, and continued through line 14 to the second reaction zone 15. The reaction mixture in the second reaction zone comprises a relatively low concentration of butadiene, the bulk of the butadiene being consumed in the first reaction zone 9.

Pursuant to the further process of this invention, unreacted and/or excess butadiene and ethylene are separated from the reaction mixture. One preferred method comprises flash distillation at a temperature of from about 100° F. to about 160° F. at a reduced pressure, say from about 20 p.s.i. to about 200 p.s.i. Thus, the reaction mixture is withdrawn from the second reaction zone 15, passing by way of line 16 to a flash distillation column 19, said reaction mixture being reduced in pressure by means of a pressure reducing valve 17 and heated to the desired temperature by a heating means 18 located in said line 16. The butadiene and ethylene flash distilled from the reaction mixture are recovered through an overhead line 21 and a cooling means 20 for recycle to the first reaction zone 9 as hereinafter described. The schematic flow diagram includes a second flash distillation column 25. By this arrrangement the reaction mixture can be treated at conditions to flash distill ethylene and butadiene therefrom without undue pressure loss thus minimizing subsequent pressure build up required of the recycle stream. Accordingly, the residual reaction mixture is withdrawn from the first mentioned flash distillation column 19 via line 22 and further treated in a second flash distillation column 25. Pressure reducing valve 23 and heating means 24 are located in line 22 to effect the second flash distillation at a further reduced pressure at a suitable temperature hereinbefore set forth.

The butadiene-ethylene overhead from the flash distillation column 25 is recovered through line 27 to be combined with the butadiene-ethylene overhead from the first flash distillation column 19 and subsequent recycle to the first reaction zone 9. The butadiene-ethylene overhead from flash distillation column 25 is shown as being recovered through a cooling means 26 located in line 27 and passing through a compressor 28 and line 29 to be combined with the butadiene-ethylene stream from line 21. The combined streams are then continued through line 29, passing through a cooling means 30 and a compressor 31 to combine with the fresh ethylene feed from line 56 and subsequently recycled to the reaction zone 9 in combination with said ethylene as hereinbefore described.

The reaction mixture is recovered from the second flash distillation column 25 through line 33 and thereafter charged to an evaporator 42 in accordance with the further process of this invention. The reaction mixture is shown being passed to said evaporator 42 through a degasser 35 which is included to insure a maximum separation of gaseous reactants from the reaction mixture. The reaction mixture is charged to the degasser 35 through a pressure reducing valve 34, located in line 33, at a reduced pressure. The gaseous materials are separated overhead by way of line 37 and recovered for recycle through a cooling means 36 located in line 37, recycle compressor 38 and line 39. Alternatively, the gaseous materials thus recovered may be discharged to the atmosphere. It is understood that other suitable means may be employed in the separation of butadiene and ethylene from the cyclocooligomerization reaction mixture including, for example, the use of a stripping column wherein the reaction mixture is passed downwardly in counterflow to a gaseous stream which may be an inert gas such as nitrogen or one of the reactants, preferably ethylene.

In any case, the reaction mixture, substantially free of ethylene and butadiene and comprising the cyclocooligomerization reaction product and catalyst in solution therewith, is charged to an evaporator 42. In the evaporator, the reaction mixture is treated at conditions to effect a separation of a portion of the cyclocooligomerization product at a rate substantially equivalent to product make, the catalyst being recovered for recycle in solution with the residual cyclocooligomerization product. Both the catalyst and the desired cyclodecadiene product are temperature sensitive, the former tending toward decomposition and the latter toward isomerization with increasing temperature. It is therefore desirable to treat the reaction mixture at a temperature at least sufficient to distill over or evaporate the cyclocooligomerization product at a rate substantially equivalent to product make and not exceeding about 180° F., preferably at a temperature of from about 100° F. to about 180° F., and more preferably from about 130° F. to about 150° F. The cyclocooligomerization product is suitably separated at a reduced pressure up to about 10 mm. without exceeding the aforesaid temperature limitations, a reduced pressure of from about 1 mm. to about 5 mm. being preferred. It is highly desirable to minimize the retention time of the heat sensitive reaction mixture at the elevated temperatures required for product separation at a suitable rate. One preferred method comprises utilizing a thin-film evaporator wherein the reaction mixture is distributed in said evaporator as a thin uniform film on a heated surface and processed through said evaporator at the aforesaid conditions of temperature and pressure.

Referring again to the schematic flow diagram, that portion of the cyclocooligomerization product separated in the evaporator 42 is withdrawn overhead through line 44. Said product is passed through a cooling means 43 to a product receiver 45 which is vented to the atmosphere by way of line 49 through a steam jet or other suitable means for maintaining the described pressure conditions in the evaporator 42. The cyclocooligomerization product is recovered from the product receiver through line 46, pump 47 and line 48.

The cyclocooligomerization catalyst is withdrawn from the evaporator 42 by way of line 50 in solution with the residual cyclocooligomerization product. The catalyst and residual product are passed through a compressor 51, through a cooling means 53 situated in line 52, and then through a second compressor 54 and line 55 to combine with the cyclocooligomerization reaction mixture recycled through the first reaction zone in the manner first described.

The following example is presented in illustration of one preferred embodiment of this invention and is not intended as a limitation of the generally broad scope of the invention as set out in the appended claims.

The cyclocooligomerization catalyst employed in the present example is prepared by charging 1572 grams of dry nickel acetlyacetonate to a nitrogen purged 2 gallon stirred autoclave equipped with suitable cooling means. The autoclave is sealed and about 2010 grams of butadiene charged thereto. The stirred autoclave contents are then cooled to about 14° F. and 4035 grams of a 15% triethyl aluminum in heptane solution is pressured into the autoclave while maintaining the temperature between 14° F. and 50° F. The addition is completed over a period of about 30 minutes. Thereafter, the temperature is brought to about 92° F. and the autoclave contents stirred at this temperature over a 1 hour period. The autoclave contents are then cooled to about 14° F., transferred to a centrifuge, and centrifuged in a nitrogen atmosphere over a 15 minute period. The centrifugate, comprising 5217 grams of 4.46% nickel, is recovered as cyclocooligomerization catalyst. The last mentioned step serves to separate aluminum salts from the catalyst which otherwise tend to accumulate throughout the process with an adverse affect on the extended periods of operation herein contemplated.

Referring to the schematic flow diagram, ethylene is charged to the process at about 500 p.s.i. and at a temperature of 100° F., said ethylene being charged at a rate of about 0.45 gram mixture recycled through the first reaction zone in the manner first described.

The following example is presented in illustration of one preferred embodiment of this invention and is not intended as a limitation of the generally broad scope of the invention as set out in the appended claims.

The cyclocooligomerization catalyst employed in the present example is prepared by charging 1572 grams of dry nickel acetylacetonate to a nitrogen purged 2 gallon stirred autoclave equipped with suitable cooling means. The autoclave is sealed and about 2010 grams of butadiene charged thereto. The stirred autoclave contents are then cooled to about 14° F. and 4035 grams of a 15% triethyl aluminum in heptane solution is pressured into the autoclave while maintaining the temperature between 14° F. and 50° F. The addition is completed over a period of about 30 minutes. Thereafter, the temperature is brought to about 92° F. and the autoclave contents stirred at this temperature over a 1 hour period. The autoclave contents are then cooled to about 14° F., transferred to a centrifuge, and centrifuged in a nitrogen atmosphere over a 15 minute period. The centrifugate, comprising 5217 grams of 4.46% nickel, is recovered as cyclocooligomerization catalyst. The last mentioned step serves to separate aluminum salts from the catalyst which otherwise tend to accumulate throughout the process with an adverse affect on the extended periods of operation herein contemplated.

Referring to the schematic flow diagram, ethylene is charged to the process at about 500 p.s.i. and at a temperature of 100° F., said ethylene being charged at a rate of about 0.45 gram moles per hour. The ethylene charge is combined with a recycle stream of ethylene and butadiene from line 32 and the combined streams comprising about 1.59 gram moles ethylene and 0.07 gram moles butadiene per hour are brought to a pressure of about 700 p.s.i.g. by means of a compressor 2 and a temperature of about 30° F. by a cooling means 4. The butadiene charge is pressured into the system by way of line 5 at a pressure of 60 p.s.i. and at a temperature of about 100° F., the butadiene being charged at the rate of about 0.97 gram moles per hour. The butadiene pressure is brought to about 700 p.s.i. by means of a compressor 6 and thereafter combined with the ethylene charge to be cooled therewith to a temperature of about 30° F. in the aforementioned cooling means 4. The ethylene and butadiene combined streams are charged to the reaction zone 9 in further combination with the circulating reaction mixture from line 12.

The reaction mixture is passed upwardly through the reaction zone 9, which is maintained at a temperature of about 56° F. and at a pressure of about 700 p.s.i., and continuously circulated through the reaction zone by means of a recycle pump 11, the circulation being by way of line 10, said pump 11, a cooling means 13 and line 12. The reaction mixture recycled to the reaction zone 9 includes recycle material from the evaporator 42, said recycle material entering the circulating reaction mixture from line 55 so that the total reaction mixture entering the reaction zone by way of line 8 comprises about 27.9 gram moles ethylene, 3.35 gram moles butadiene, 1.64 gram moles n-decatriene (NDT), 18.12 gram moles cyclodecadiene (CDD), 5.97 gram moles cyclododecatriene (CDT) and about 1.40 gram moles of nickel catalyst (calculated as elemental nickel) per hour.

The reaction mixture is recovered from the first reaction zone at a rate to allow an average residence time of about 4 hours therein. The reaction mixture is recovered and passed through line 14 to the second reaction zone 15 and maintained therein for an average residence time of about 2 hours at 57° F. and 700 p.s.i. The reaction mixture comprising about 1.17 gram moles ethylene, 0.10 gram moles butadiene, 0.07 gram moles of NDT, 0.79 gram moles CDD, 0.26 gram moles CDT and about 0.06 gram moles nickel catalyst (calculated as elemental nickel) per hour is withdrawn from the second reaction zone by way of overhead line 16. This reactor effluent stream is charged to the first flash distillation column 19 being reduced in pressure by means of pressure reducing valve 17 and heated by a heating means 18 so as to be flash distilled at about 200 p.s.i. and at a temperature of 160° F. The bottoms from said distillation column are recovered through line 22, further reduced in pressure by means of pressure reducing valve 23, reheated in heating means 24 to be further flash distilled in the second flash distillation column at a temperature of 160° F. and at a pressure of 20 p.s.i. The reaction mixture charged to the second flash distillation column by way of line 22 comprises about 0.30 gram moles ethylene, 0.07 gram moles butadiene, 0.07 gram moles NDT, 0.79 gram moles CDD, 0.26 gram moles CDT and about 0.06 gram moles nickel catalyst (calculated as elemental nickel) per hour.

The overhead from the second flash distillation column 25 is cooled in a cooling means 26 and combined with the overhead from flash distillation column 19 at about 200 p.s.i. by means of a compressor 28 and the combined overhead streams are further cooled to about 198° F. by a cooling means 30 and further combined with the fresh ethylene feed in line 1 at a pressure of about 500 p.s.i. by means of a compressor 31.

The bottoms from the second flash distillation column 25 are recovered through line 33 and charged to a degasser 35 for the separation of residual amounts of ethylene and butadiene contained therein. The bottoms stream is passed through a pressure reducing valve 34 and treated in the degasser at a pressure of about 2 p.s.i. and at a temperature of about 160° F., the ethylene and butadiene overhead being withdrawn through line 37, cooling means 36, compressor 38 being provided for recycle, for example to the flash distillation column 25, at a suitable temperature and pressure. The overhead is recovered through line 39.

The degasser bottoms are charged to the evaporator 42 through line 40 passing through a pressure control valve 41. The degasser bottoms charged to the evaporator comprise about 0.002 gram moles ethylene, 0.002 gram moles butadiene, 0.07 gram moles NDT, 0.79 gram moles CDD, 0.26 gram moles CDT and about 0.06 gram moles nickel catalyst (calculated as elemental nickel) per hour. The evaporator comprises a commercially available Rodney- Hunt Turbafilm Evaporator maintained at a reduced pressure of about 1–5 mm. and at a temperature of 140° F. About 0.05 gram moles of NDT, 0.41 gram moles of CDD and about 0.02 gram moles of CDT are recovered overhead through line 44 per hour. The product is cooled by cooling means 43 and collected in a product receiver at a temperature of about 30° F. and at a pressure of about 4 mm. The settling tank is vented through line 49 to steam jets employed to maintain the reduced pressure in the evaporator. The product is thereafter recovered from the process by way of line 46, by means of pump 47, and through line 48.

The nickel catalyst is recovered from the evaporator for recycle in solution with a portion of the cyclocooligomerization product. About 0.06 moles of nickel catalyst (calculated as elemental nickel) in solution with the residual cyclocooligomerization product comprising about 0.02 gram moles of NDT, 0.38 gram moles of CDD, and 0.24 gram moles of CDT per hour is recycled through line 55 to combine with the circulating reaction mixture in line 12 as aforesaid. The catalyst recycle stream is charged through a pump 51, a cooling means 53 and a pump 54 to combine with the circulating reaction mixture at a temperature of about 120° F. and at a pressure of 700 p.s.i., the circulating reaction mixture being subsequently reduced to a temperature of about 30° F. by means of the aforementioned cooling means 13.

We claim as our invention:

1. In the cyclocooligomerization of ethylene and butadiene, the continuous steps of
    (a) charging ethylene, butadiene and a homogeneous nickel catalyst to a reaction zone at cyclocooligomerization reaction conditions and forming a reaction product comprising cyclodecadiene, cyclododecatriene and n-dicatriene,
    (b) withdrawing the resultant reaction mixture and separating ethylene and butadiene therefrom,
    (c) charging the residual reaction mixture to a separation column and flashing a portion of the reaction product therefrom at a temperature of from about 100° F. to about 180° F. and at a pressure of from about 0.1 mm. to about 10 mm.
    (d) recovering the catalyst from said separation column in solution with the residual reaction product and recycling the same to the aforesaid reaction zone.

2. In the cyclocooligomerization of ethylene and butadiene, the continuous steps of:
    (a) charging ethylene, butadiene and a homogeneous nickel catalyst to a reaction zone and circulating the reaction mixture therein for a period of from about 0.5 to about 6 hours at cyclocooligomerization reaction conditions and forming a reaction product comprising cyclodecadiene, cyclododecatriene and n-decatriene,
    (b) withdrawing the resultant reaction mixture and separating ethylene and butadiene therefrom,
    (c) charging the residual reaction mixture to a separation column and flashing a portion of the reaction product therefrom, at a temperature of from about 100° F. to about 180° F. and at a pressure of from about 0.1 mm. to about 10 mm.,
    (d) recovering the catalyst from said separation column in solution with the residual reaction product and recycling the same to the aforesaid reaction zone.

3. In the cyclocooligomerization of ethylene and butadiene, the continuous steps of:
    (a) charging ethylene, butadiene and a homogeneous nickel catalyst to a deaction zone and circulating the reaction mixture therein for a period of from about 0.5 to about 6 hours at cyclocooligomerization reaction conditions and forming a reaction product comprising cyclodecadiene, cyclododecatriene and n-decatriene,
    (b) withdrawing the resultant reaction mixture and separating ethylene and butadiene therefrom,
    (c) charging the residual reaction mixture to a separation column, distributing the same therein as a thin surface film and flashing a portion of the reaction product therefrom at a temperature of from about 100° F. to about 180° F. and at a pressure of from about 1 mm. to about 5 mm.
    (d) recovering the catalyst from said separation column in solution with the residual reaction product and recycling the same to the aforesaid reaction zone.

4. In the cyclocooligomarization of ethylene and butadiene, the continuous steps of:
    (a) charging ethylene, butadiene and a nickel catalyst substantially free of aluminum salts to a reaction zone and circulating the reaction mixture therein for a period of from about 0.5 to about 6 hours at cyclocooligomerization reaction conditions and forming a reaction product comprising cyclodecadiene, cyclododecatriene and n-decatriene,
    (b) withdrawing the resultant reaction mixture and separating ethylene and butadiene therefrom,
    (c) charging the residual reaction mixture to a separation column, distributing the same therein as a thin surface film and flashing a portion of the reaction product therefrom at a temperature of from about 100° F. to about 180° F. and at a pressure of from about 1 mm. to about 5 mm.,
    (d) recovering the catalyst from said separation column in solution with the residual reaction product and recycling the same to the aforesaid reaction zone.

5. In the cyclocooligomerization of ethylene and butadiene, the continuous steps of:
    (a) charging ethylene, butadiene and a nickel catalyst substantially free of aluminum salts to a reaction zone and circulating the reaction mixture therein for a period of from about 0.5 to about 6 hours at cyclocooligomerization reaction conditions and forming a reaction product comprising cyclodecadiene, cyclododecatriene and n-decatriene,
    (b) withdrawing the resultant reaction mixture and separating ethylene and butadiene therefrom,
    (c) charging the residual reaction mixture to a separation column, distributing the same therein as a thin surface film and flashing a portion of the reaction product therefrom at a temperature of from about 130° F. to about 150° F. and at a pressure of from about 1 mm. to about 5 mm.,
    (d) recovering the catalyst from said separation column in solution with the residual reaction product and recycling the same to the aforesaid reaction zone.

References Cited

FOREIGN PATENTS 942,274 11/1963 Great Britain.
1,275,359 9/1961 France.
1,351,938 12/1963 France.

OTHER REFERENCES

G. Wilke: "Ang. Chem. International Ed." (Eng), vol. 2, No. 3, pp. 105–115, March 1963.

P. Heimbach: "Ang. Chem. International Ed." (Eng), vol. 3, No. 10, pp. 702–703, October 1964.

DELBERT E. GANTZ, *Primary Examiner.*

V. O'KEEFE, *Assistant Examiner.*